No. 835,088. PATENTED NOV. 6, 1906.
O. J. WILDER.
CONCRETE ROOFING.
APPLICATION FILED JAN. 2, 1906.

Witnesses
Louie Cilley.
Cecil C. Cilley.

Inventor
Orlin J. Wilder,
By Ichiel J. Cilley
Attorney

UNITED STATES PATENT OFFICE.

ORLIN J. WILDER, OF GRAND RAPIDS, MICHIGAN.

CONCRETE ROOFING.

No. 835,088.  Specification of Letters Patent.  Patented Nov. 6, 1906.

Application filed January 2, 1906. Serial No. 294,313.

*To all whom it may concern:*

Be it known that I, ORLIN J. WILDER, a citizen of the United States, residing at Grand Rapids, in the county of Kent and State of Michigan, have invented certain new and useful Improvements in Roofing, of which the following is a specification.

My invention relates to improvements in concrete roofing; and its objects are, first, to render a cement and sand concrete flexible to an extent that will avert the danger of cracking or breaking with any probable pressure upon or sagging of the roof; second, to so impregnate the sand and cement with an absorbent material that will so take up the surplus moisture of the concrete as to prevent dripping of water after the plastic concrete is laid upon the roof-boards, and, third, to provide an available means of tying the cement and sand particles together and render the completed and dried roof not only flexible, but indestructible, and yet impervious to the changes of the atmosphere.

I attain these objects by the construction and distribution of elements shown in the accompanying drawings and hereinafter more fully described.

Figure 1:
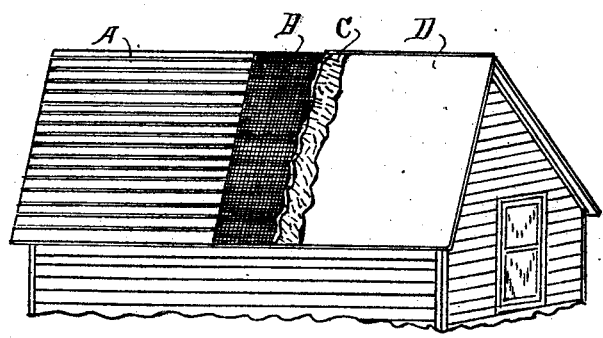
Figure 2:

In the drawings, Figure 1 represents the roof of a building in the several stages of construction; and Fig. 2 indicates the manner of mixing the concrete cement or plaster, including the absorbent material used.

This invention relates particularly to improvements in the roof described and claimed in Letters Patent No. 756,756, issued to me April 5, 1904, for improvements in concrete roofs.

Similar letters refer to similar parts in both views.

In the accompanying drawings, A represents the naked roof-boards, B represents a sheet of burlap or other coarse fabric spread upon and secured to the roof-boards, C shows the distribution of the fiber as intermixed with the sand and cement, and D represents the completed roof.

The object of placing the burlap upon the roof-boards is, as stated in my previous patent, hereinbefore mentioned, twofold—namely, first, to avert the danger of the plastic concrete sliding on the roof-boards when being spread, and, second, to carry off the surplus moisture and avert the danger of dripping down through the cracks between the roof-boards.

The absorbent fiber C, which I use in connection with the sand and cement in forming them into a plastic mortar, consists of short pieces of wood fiber cut longitudinally of the grain of the wood, and for this use I prefer fiber from white oak or elm, as these woods are more tenacious than most others and will more readily absorb the moisture from the cement and give out in return a sap whose chemical action toughens the cement concrete and gives it a flexibility that will permit of bending the completed and dried concrete to a considerable degree without breaking or cracking, though many other woods are well adapted for the purpose and may be used with satisfactory success.

I find that the best proportions for mixing the ingredients for this concrete are about as follows: To one part of Portland cement and three parts of fine sharp sand add one part of well-prepared wood fiber, as hereinbefore intimated, and mix them thoroughly while yet dry, so that the wood fiber will fully and equally intermingle with the sand and cement, after which sufficient water must be added to thoroughly moisten the entire mass and reduce it to a thick plastic state, when it must be again thoroughly mixed and kneaded into a stiff mortar that may be easily, evenly, and uniformly spread upon the roof.

I find it not only advantageous but very desirable to cover the completed roof when thoroughly dry with a good coat or two of mineral paint, as it has a threefold effect upon it: first, to protect the roof from the direct action of the weather, and thus to add materially to its lasting qualities; second, the oil and mineral elements permeates the concrete, including the wood fiber and its distributed sap, and greatly increases the flexibility of the mass, and, third, it enables me to give to the roof any attractive color desired, and thus avoid the monotony that would exist if only the pale gray of cement concrete could be used.

The burlap sheet B is not an absolutely necessary element in the construction of this roof, as the wood fiber absorbs sufficient of the surplus moisture in the plastic concrete to avert the danger either of the concrete sliding on the roof-boards or of the moisture dripping through the cracks between the roof-boards A; but the roof will prove much more satisfactory with than without the burlap sheet.

The use of wood fiber in this concrete roofing effects another very desirable object—namely, to greatly lessen the weight of the completed roof, thus averting much of the danger of sagging the roof-boards by reason of the excessive weight of the concrete covering, where made of plain sand and cement, and for this reason I aim to make the wood-fiber element as large as possible consistent with a strong, reliable, and lasting coating, and also the flexibility thus imparted to the concrete enables me to construct a much stronger and more satisfactory roof with a much thinner coat of concrete than without the fiber.

Having thus fully described my invention, what I claim as new, and desire to secure by Letters Patent of the United States, is—

1. A concrete roof-mortar composed of sand, cement, and wood fiber in practically the proportions specified, mixed, moistened and spread upon the roof of a house, substantially as specified.

2. A concrete roof-mortar composed of sand, cement, wood fiber and water, mixed in the proportions and as specified.

3. In combination with the roof of a building, a concrete covering composed of sand, cement, fiber, and water and spread upon the roof, substantially as specified.

4. In combination with the roof of a building, a burlap sheet spread upon the roof, a mortar composed of sand, cement, wood fiber in strings cut longitudinally of the grain, and water, in substantially the proportions specified, and spread, substantially as specified.

5. In combination with the roof of a building, a sheet of coarse fiber secured to the roof, a mortar of sand, cement, fiber, and water, mixed in the proportions specified and spread upon the roof, and a coat of mineral paint over the concrete covering, substantially as specified.

6. In combination with the roof of a building, a mortar composed of sand, cement, fiber, and water, in substantially the proportions stated, made plastic and spread upon the roof, and a coat of mineral paint and oil spread over the mortar, substantially as specified.

Signed at Grand Rapids, Michigan, December 28, 1905.

ORLIN J. WILDER.

In presence of—
I. J. CILLEY,
E. L. GOUGH.